United States Patent
Kim et al.

(10) Patent No.: US 7,826,840 B2
(45) Date of Patent: Nov. 2, 2010

(54) METHOD OF HAND-OVER IN THE MIXED NETWORK OF ASYNCHRONOUS COMMUNICATION NETWORK AND SYNCHRONOUS COMMUNICATION NETWORK

(75) Inventors: Hyun-Wook Kim, Gyeonggi-do (KR); Young-Lak Kim, Gyeonggi-do (KR); Nam-Gun Kim, Seoul (KR); Jong-Tae Ihm, Gyeonggi-do (KR)

(73) Assignee: SK Telecom Co., Ltd., Seoul (KR)

( * ) Notice: Subject to any disclaimer, the term of this patent is extended or adjusted under 35 U.S.C. 154(b) by 459 days.

(21) Appl. No.: 11/576,588

(22) PCT Filed: Jan. 5, 2005

(86) PCT No.: PCT/KR2005/000022

§ 371 (c)(1),
(2), (4) Date: Dec. 11, 2007

(87) PCT Pub. No.: WO2006/073213

PCT Pub. Date: Jul. 13, 2006

(65) Prior Publication Data

US 2008/0207205 A1    Aug. 28, 2008

(51) Int. Cl.
*H04W 4/00*    (2009.01)
*H04W 36/00*   (2009.01)
*H04M 1/00*    (2006.01)

(52) U.S. Cl. .................. 455/432.1; 455/435.2; 455/436; 455/552.1; 370/328; 370/331

(58) Field of Classification Search .............. 455/432.1, 455/435.2, 436, 552.1, 553.1; 370/331, 328
See application file for complete search history.

(56) References Cited

U.S. PATENT DOCUMENTS

| 6,704,581    | B1 * | 3/2004  | Park et al. ............... 455/553.1 |
| 2003/0224791 | A1 * | 12/2003 | Choi et al. ................ 455/436   |
| 2005/0043046 | A1 * | 2/2005  | Lee ........................... 455/502 |

FOREIGN PATENT DOCUMENTS

| JP | 11-136727   | 5/1999  |
| JP | 2001-186552 | 7/2001  |
| JP | 2001-186552 | 8/2001  |
| JP | 2001-224052 | 8/2001  |
| WO | 00/74275    | 12/2000 |
| WO | 01/03464    | 1/2001  |

* cited by examiner

*Primary Examiner*—Un C Cho
(74) *Attorney, Agent, or Firm*—Lowe Hauptman Ham & Berner LLP

(57) ABSTRACT

In the present invention, as a mobile communication terminal, which is using service in the area of an asynchronous mobile communication system, detects signals from a synchronous mobile communication system, the mobile communication terminal repeatedly performs a process of examining whether, in a predetermined time, signals from the asynchronous mobile communication system have been detected a designated number of times, and measuring the intensity of the signals. When the number of times that the intensity of signals from the asynchronous mobile communication system is smaller than a designated number of times, or no signals from the asynchronous mobile communication system are detected, within the predetermined time, it is determined whether to perform handover of the mobile communication terminal.

6 Claims, 3 Drawing Sheets

ମETHOD OF HAND-OVER IN THE MIXED NETWORK OF ASYNCHRONOUS COMMUNICATION NETWORK AND SYNCHRONOUS COMMUNICATION NETWORK

CROSS REFERENCE TO RELATED APPLICATION

This application is the National Phase application of International Application No. PCT/KR2005/000022, filed Jan. 5, 2005, which designates the United States and was published in English. This application, in its entirety, is incorporated herein by reference.

TECHNICAL FIELD

The present invention relates generally to a handover method in a mobile communication network and, more particularly, to a method capable of increasing the success rate of handover of a mobile communication terminal in a mobile communication network in which an asynchronous network and a synchronous network coexist.

BACKGROUND ART

With the development of mobile communication technology and the evolution of communication networks, various types of mobile communication systems have been developed. In order to resolve the problem of global roaming between the mobile communication systems, International Mobile Telecommunications (IMT)-2000 systems have been developed. The IMT-2000 systems are divided into a CDMA 2000-based synchronous system and a WCDMA-based asynchronous system.

Furthermore, in order to support global roaming between mobile communication systems, Dual Band Dual Mode (DBDM) mobile communication terminals usable both in a synchronous system and in an asynchronous system have been developed. Using such a mobile communication terminal, it is possible to use different types of services both in the area of an asynchronous system and the area of a synchronous system.

Currently, an asynchronous mobile communication system is being constructed in areas in which high demand for service exists and, therefore, a synchronous mobile communication system is being evolved into a form in which the service area thereof includes the service areas of the asynchronous mobile communication system. When a user moves between the asynchronous mobile communication system and the synchronous mobile communication system, handover between the systems is required in order to provide continuous service.

Particularly, when the mobile communication terminal is located on the border between an asynchronous area and a synchronous area, or a shadow area in the communication, such as underground, precise handover for the mobile communication terminal must be performed.

FIG. 1 is a conceptual diagram illustrating handover in a mobile communication network in which an asynchronous network and a synchronous network coexist.

As illustrated, in the case in which a mobile communication terminal 10 which is using service in an asynchronous area A moves into the overlap area of the asynchronous area A and a synchronous area B (through the movement path C of the terminal), there are problems in that the intensity of signals between the asynchronous area A and the mobile communication terminal 10 is similar to that of signals between the synchronous area B and the mobile communication terminal 10, and variation in electric field strength is considerable, so that handover is not precisely performed and it takes a long time to perform the handover.

DISCLOSURE OF THE INVENTION

Accordingly, the present invention has been made keeping in mind the above problems occurring in the prior art and an object of the present invention is to provide a handover method capable of increasing the success rate of handover by performing handover when the intensity of signals between a mobile communication terminal and one mobile communication system, which currently provides service, is measured a designated number of times and it is subsequently determined that the mobile communication terminal has moved into the area of another mobile communication system.

BEST MODE FOR CARRYING OUT THE INVENTION

In the present invention, as a mobile communication terminal, which is using service in the area of an asynchronous mobile communication system, detects signals from a synchronous mobile communication system, the mobile communication terminal repeatedly performs a process of examining whether, in a predetermined time, signals from the asynchronous mobile communication system have been detected a designated number of times, and measuring the intensity of the signals. When the number of times that the intensity of the signals from the asynchronous mobile communication system is smaller than a designated number of times, or no signals from the asynchronous mobile communication system are detected, within the predetermined time, it is determined whether to perform handover of the mobile communication terminal.

A mobile communication terminal applied to the present invention is a DBDM mobile communication terminal, and can provide both asynchronous mobile communication service and synchronous mobile communication service. The DBDM mobile communication terminal can wirelessly access each of an asynchronous mobile communication system, and a synchronous mobile communication system and use voice and data services. Furthermore, the DBDM mobile communication terminal is connected between the asynchronous mobile communication system and the synchronous mobile communication system, and transmits and processes signal processing states between the two systems.

In one mobile communication system, handover (or handoff) refers to the technology of allowing a user to perform communication without the disconnection of a call when a mobile communication terminal moves from one cell to another cell.

The present invention provides a handover method for a DBDM mobile communication terminal in a network in which an asynchronous mobile communication system and a synchronous mobile communication system coexist. The following description is given for the case in which a mobile communication terminal moves from an asynchronous mobile communication system into a synchronous mobile communication system, rather than the case in which the mobile communication terminal moves from the synchronous mobile communication system into the asynchronous mobile communication system.

A preferred embodiment of the present invention is described below in detail with reference to the accompanying drawings.

Figure 1:
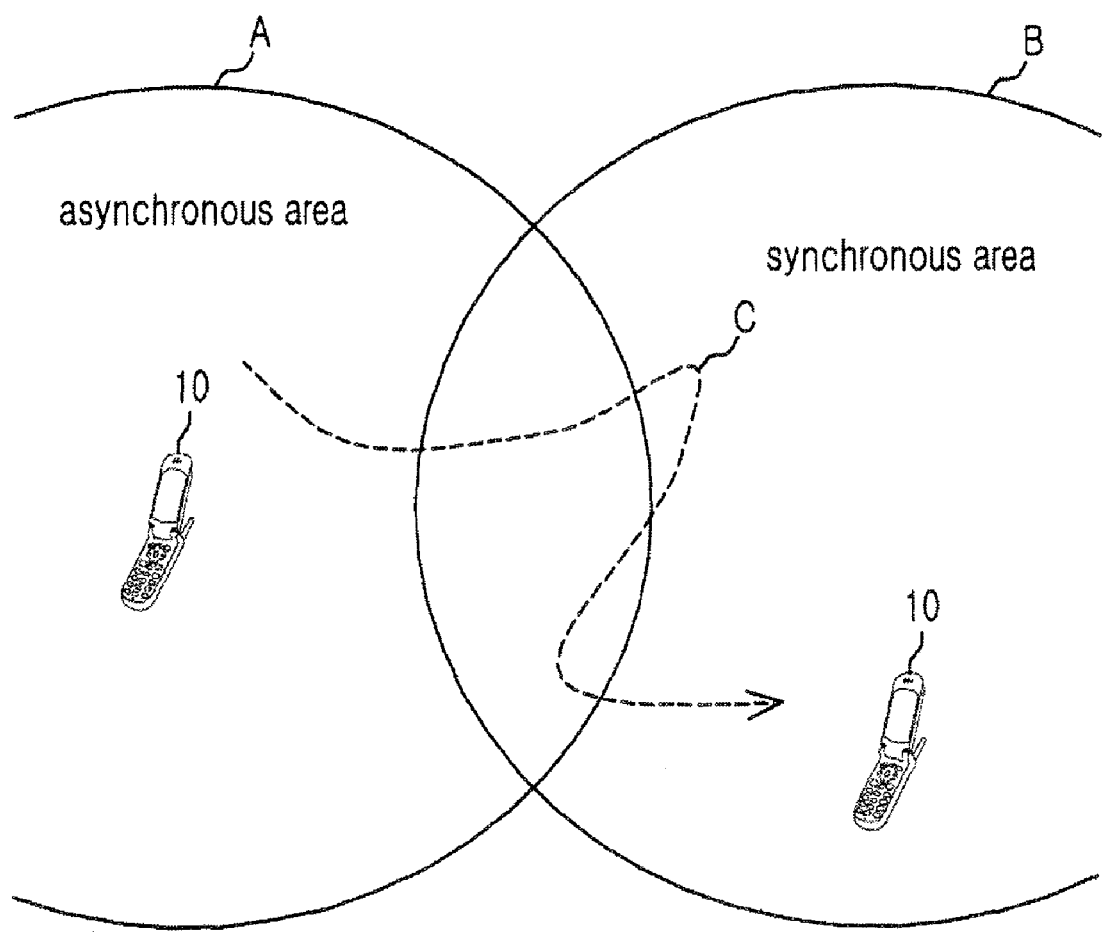
FIG. 1 is a conceptual diagram illustrating handover in a mobile communication network in which an asynchronous network and a synchronous network coexist.
Figure 2:
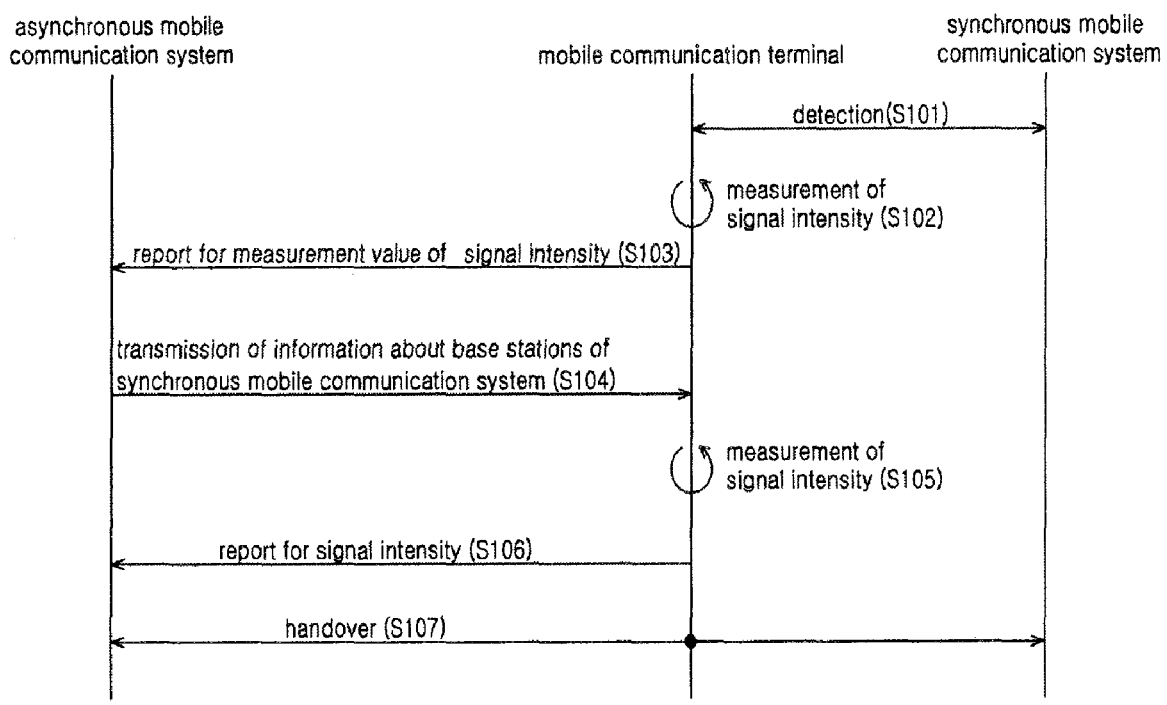
FIG. 2 is a flowchart illustrating a general handover method.

FIG. 2 is a flowchart illustrating a general handover method.

A mobile communication terminal continuously monitors synchronous channels and common pilot channels not only for the base station of an area in which the mobile communication terminal is currently located but also for neighboring base stations, and measures the intensities of the signals. When the mobile communication terminal, which is using service in the area of an asynchronous mobile communication system, moves into the area of a synchronous mobile communication system, the intensity of signals from the asynchronous mobile communication system becomes weak. When the measured intensity of signals from the asynchronous mobile communication system is lower than a predetermined value at steps S101 and S102, the mobile communication terminal reports this to the asynchronous mobile communication system at step S103.

The asynchronous mobile communication system, having received this report, becomes aware that the mobile communication terminal is currently located on the border between the area of the asynchronous mobile communication system and the area of the synchronous mobile communication system, determines that handover to the synchronous mobile communication system is required, informs the mobile communication terminal of information about the base stations of a neighboring synchronous mobile communication system, and directs the mobile communication terminal to measure and report the intensity of signals from the synchronous mobile communication system.

As a result, the mobile communication terminal measures the intensity of signals from the synchronous mobile communication system at step S105, and reports the measured intensity to the asynchronous mobile communication system at step S106. The asynchronous mobile communication system requests handover to the synchronous mobile communication system by informing the synchronous mobile communication system of the report of the mobile communication terminal, Thereafter, the handover is performed according to a predetermined procedure at step S107.

In the handover method, when variation in the electric field strength of a wireless communication section is considerable, like the case where the mobile communication terminal is located on the border between the area of the asynchronous mobile communication system and the area of the synchronous mobile communication system, it is impossible to perform precise handover. For example, when the mobile communication terminal, which has moved from the area of an asynchronous mobile communication system into the overlap area between the areas of the asynchronous and synchronous mobile communication systems, and then moves from the overlap area into the area of the synchronous mobile communication system, handover from the asynchronous mobile communication system to the synchronous mobile communication system is performed.

However, when the mobile communication terminal immediately moves back to the overlap area, and the intensity of signals from the asynchronous mobile communication system is greater than that of signals from the synchronous mobile communication system in the overlap area where the mobile communication terminal is ultimately located, the quality of a call decreases or the call is disconnected, so that handover must be performed again.

Therefore, handover must be performed when the intensity of signals from a different mobile communication system is stable upon movement of a mobile communication terminal.

For this purpose, in the present invention, as a mobile communication terminal, which is using services in an asynchronous mobile communication system, detects signals from a synchronous mobile communication system, it repeatedly performs a process of examining whether, in a predetermined time, signals from the asynchronous mobile communication system have been detected a designated number of times, and measuring the intensity of the signals. Handover is performed when the measured signal intensity is lower than a predetermined threshold value.

Figure 3:
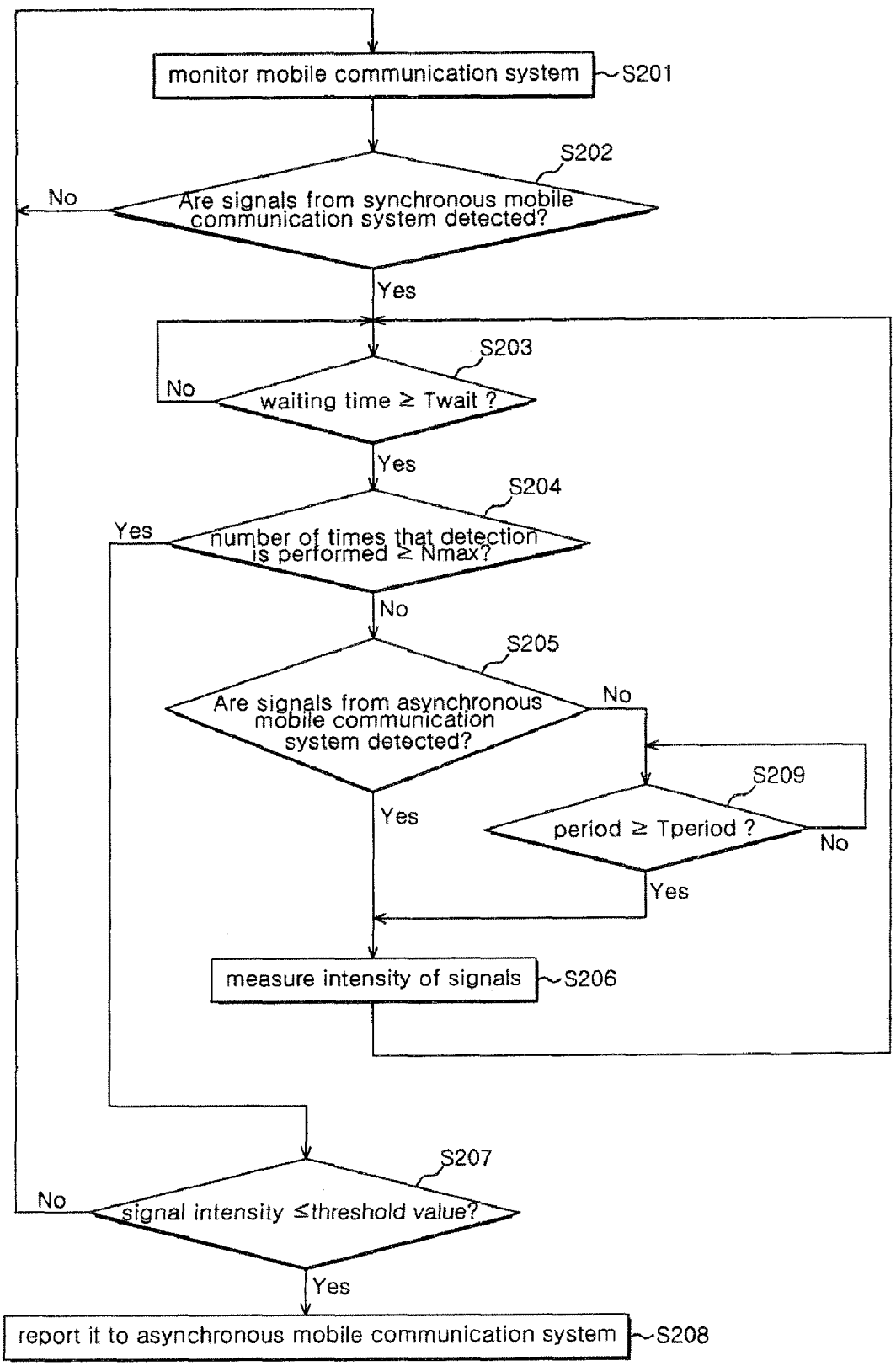
FIG. 3 is a flowchart illustrating a handover method according to the present invention.

FIG. 3 is a flowchart illustrating a handover method according to the present invention.

A mobile communication terminal, which is using service in an asynchronous mobile communication system, continuously monitors the synchronous channels and common pilot channels not only for the base station of an area in which the mobile communication terminal is currently located, but also for neighboring base stations at step S201.

In this case, when signals from the synchronous mobile communication system are detected at step S202, the mobile communication terminal waits for a predetermined Time. $T_{wait}$, at step S203. The number of times that the intensity of signals detected from the asynchronous mobile communication system has reached a designated number of times, $N_{max}$, is then examined at step S204. If, as a result of the examination, the number of times that the intensity of signals from the asynchronous mobile communication system is determined to be below the designated number of times $N_{max}$, whether or not signals from the asynchronous mobile communication system are detected is examined at step S205. The intensity of the signals is measured when the signals are detected at step S208. Steps S203, S204 and S205 are repeatedly performed a designated number of times $N_{max}$, while the number of times that signals from the asynchronous mobile communication system are detected is increased.

After examining whether a predetermined time $T_{wait}$ has elapsed and examining whether signals from the asynchronous mobile communication system have been detected a designated number of times $N_{max}$, it is determined whether the intensity of the last signals from the asynchronous mobile communication system is larger than a predetermined threshold value at step S207. If the intensity is larger than the predetermined threshold value, the process returns to step S201 of monitoring the asynchronous mobile communication system and the synchronous mobile communication system.

Meanwhile, when no signals from the asynchronous mobile communication system are detected at step S205, in which whether or not signals from an asynchronous mobile communication system are detected is examined, a designated time, $T_{period}$, elapses at step S209 and the process then proceeds to step S206 of measuring the intensity of signals from the asynchronous mobile communication system.

In this case, it is preferable that information about a waiting time $T_{wait}$ for the detection of signals from an asynchronous mobile communication system, the number of times $N_{max}$ that detection is performed, and a waiting time $T_{period}$ in the case where no signals from an asynchronous mobile communication system are detected are transmitted using the System Information Block (SIB) of the asynchronous mobile communication system. The waiting time $T_{wait}$ may be set to, for example, 30 to 90 seconds, the number of times $N_{max}$ that detection is performed may be set to, for example, 8 to 12, and the waiting time $T_{period}$ in the case where no signals from the asynchronous mobile communication system are detected may be set to, for example, 4 to 6 minutes.

Furthermore, when the measured intensity of signals from the asynchronous mobile communication system is below the predetermined threshold value at step S207, the mobile communication terminal reports this to the asynchronous mobile communication system at step S208.

The asynchronous mobile communication system determines that the mobile communication terminal requires handover to the synchronous mobile communication system based on the report from the mobile communication terminal, and causes a handover procedure to be performed between the asynchronous mobile communication system, the mobile communication terminal, and the synchronous mobile communication system.

For the performance of the handover, the mobile communication terminal transmits information about the pilot channel of the synchronous mobile communication system to the asynchronous mobile communication system, thereby allowing the asynchronous mobile communication system to easily direct the handover. Particularly, in the present invention, when transmitting information about the pilot channel of the synchronous mobile communication system to the asynchronous mobile communication system, the mobile communication terminal assigns a specific value (for example, '0') to a scrambling code which is a field defined by the asynchronous mobile communication system, so that there are advantages in that the base station of the asynchronous mobile communication system can easily become aware of the radio environment of the synchronous mobile communication system, and a search for the base station of the synchronous mobile communication system can be performed using signals from the asynchronous mobile communication system.

Since a detailed handover procedure is performed according to a procedure designated by the operator of a mobile communication system, a detailed description thereof is omitted. It is preferable to employ a method capable of more rapidly performing a handover without the occurrence of call disconnection during the handover.

Those skilled in the art can understand that the present invention can be implemented in specific forms without alteration of the technical spirit and essential characteristics of the invention. As a result, it is to be understood that the above-described embodiment is illustrative in all respects, and not restrictive. The scope of the present invention is defined by the accompanying claims rather than the detailed description, and modifications and variations, which are derived from the spirit and scope of the claims and equivalents thereto, are included in the scope of the present invention.

INDUSTRIAL APPLICABILITY

According to the above-described present invention, in a mobile communication network in which an asynchronous mobile communication system and a synchronous mobile communication system coexist, the mobile communication terminal detects signals from the synchronous mobile communication system, examines whether signals from the asynchronous mobile communication system have been detected a designated number of times, and allows handover to be performed when the intensity of signals from the asynchronous mobile communication system is lower than a predetermined threshold value, so there is an advantage in that the handover is precisely performed.

The invention claimed is:

1. A handover method of a Dual Band Dual Mode (DBDM) mobile communication terminal in a mobile communication network in which an asynchronous mobile communication system and a synchronous mobile communication system coexist, comprising the sequential steps of:
   the mobile communication terminal in service with the asynchronous mobile communication system detecting signals from a synchronous mobile communication system;
   if signals from a synchronous mobile communications system are detected, repeatedly performing a process of:
      examining whether a predetermined time $T_{wait}$ has elapsed,
      examining whether the signals from the asynchronous mobile communication system have been detected a designated number of times $N_{max}$, and
      measuring the intensity of the signals from the asynchronous mobile communication system; and
   handing over the mobile communications terminal from the asynchronous mobile communication system to the synchronous mobile communication system when the measured signal intensity from the asynchronous mobile communications system is lower than a predetermined threshold value.

2. The handover method as set forth in claim 1, further comprising:
   transmitting, in a System Information Block (SIB) defined by the asynchronous mobile communication system, information about the waiting time $T_{wait}$ for the detection of signals from an asynchronous mobile communication system, the number of times $N_{max}$ that detection is performed, and a waiting time $T_{period}$ in a case where no signals from the asynchronous mobile communication system are detected.

3. The handover method as set forth in claim 1, wherein the step of examining whether signals from the asynchronous mobile communication system are detected comprises the steps of:
   examining whether a designated waiting time $T_{period}$ has elapsed when no signals from the asynchronous mobile communication system are detected; and
   measuring the intensity of signals from the asynchronous mobile communication system when the designated time $T_{period}$ has lapsed.

4. The handover method as set forth in claim 3, wherein information about the waiting time $T_{period}$ is transmitted to the mobile communication terminal by the asynchronous mobile communication system through a System Information Block (SIB).

5. The handover method as set forth in claim 1, wherein the step of reporting the intensity of the signals to the asynchronous mobile communication system comprises the step of the mobile communication terminal transmitting information about a pilot channel of the synchronous mobile communication system to the asynchronous mobile communication system.

6. The handover method as set forth in claim 5, further comprising:
   transmitting a code, representing a radio environment between the mobile communication terminal and the synchronous mobile communication system in a specific field of a message, the message representing the information about a pilot channel of the synchronous mobile communication system.

* * * * *